Oct. 2, 1951     N. A. SCHASSBERGER     2,569,955
TRANSPARENT PANEL SUPPORT
Filed Dec. 10, 1945
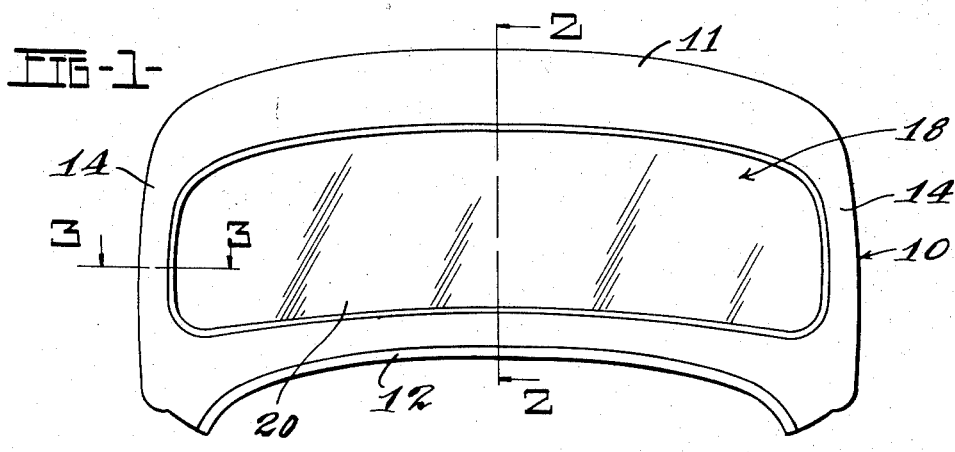
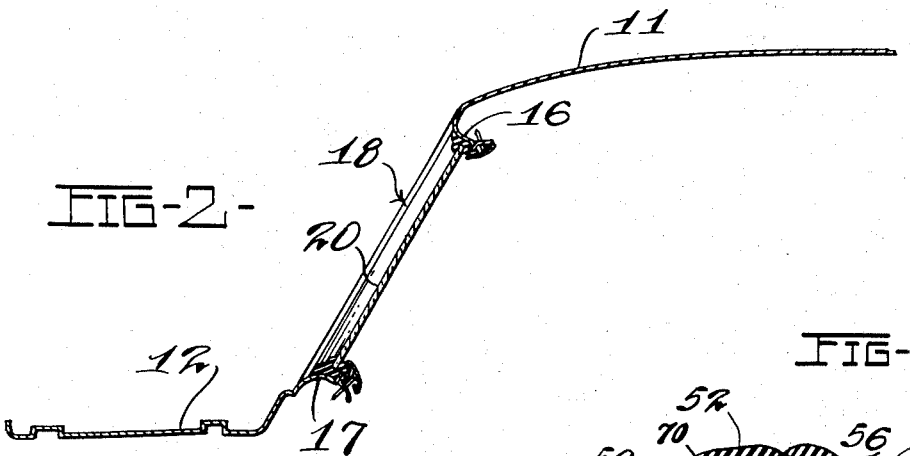
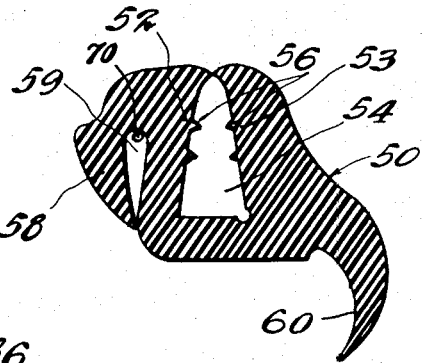
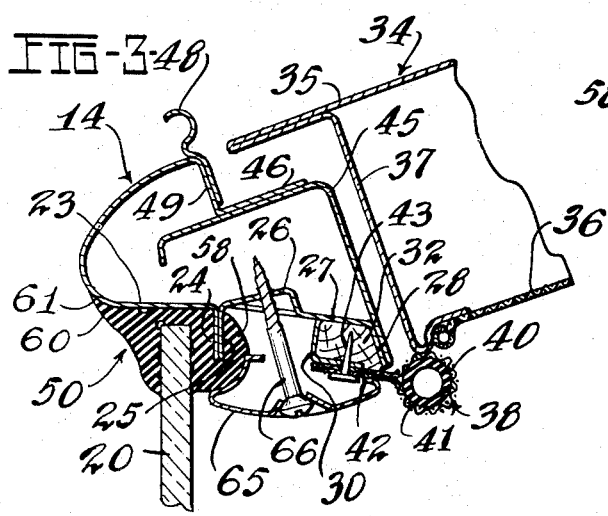
INVENTOR.
NORMAN A. SCHASSBERGER
BY Harry O. Ernsberger
ATTORNEY Patented Oct. 2, 1951

2,569,955

UNITED STATES PATENT OFFICE 2,569,955

TRANSPARENT PANEL SUPPORT

Norman A. Schassberger, Toledo, Ohio, assignor to Willys-Overland Motors, Inc., Toledo, Ohio, a corporation of Delaware Application December 10, 1945, Serial No. 633,959

2 Claims. (Cl. 296—84)

This invention relates to window glazing and mounting means therefor and more especially to a method and means of mounting a transparent windshield panel in a vehicle.

This invention embraces a method and means for applying a transparent windshield panel to a vehicle windshield opening wherein such panel may be introduced into position from the exterior of the vehicle.

The invention comprehends a method and means of affixing a windshield in a vehicle window opening by means applied from the outside of the vehicle and of a character for resiliently supporting the windshield without the use of cementitious material.

An object of the invention resides in a simple yet effective mounting means for the vehicle windshield wherein the vehicle pillar post construction adjacent the windshield panel may be made of smaller dimension whereby the "blind spot" existent by reason of the pillar post construction is greatly reduced.

A further object is the provision of a simple yet effective mounting for vehicle windshields of inexpensive construction and wherein the labor of assembly is greatly reduced over prior methods of installation.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred in which:

Figure 1 is a front elevational view of a portion of a vehicle body windshield installation;

Figure 2 is a vertical sectional view through a portion of the body construction the view being taken substantially on the line 2—2 of Figure 1;

Figure 3 is an enlarged fragmentary detail sectional view taken substantially on the line 3—3 of Figure 1 illustrating a form of windshield mounting and pillar post construction of my invention;

Figure 4 is an enlarged sectional detail view illustrating the sectional configuration of a resilient mounting for directly supporting the windshield panel.

While I have illustrated the arrangement of my invention as particularly adaptable for mounting a windshield panel in a vehicle, it is to be understood that other window openings such as the rear and side window openings may be glazed and the glazing supported in the manner of my invention, and that I contemplate the use of the invention in other installations of glazed windows or the like wherever the invention may be found to have utility.

Referring to the drawings in detail, numeral 10 designates the forward portion of a vehicle body including a top portion 11 and a cowl portion 12 which are integrally joined by pillar portions or posts 14. The forward extremity of the top portion 11 terminates in a depending and inwardly extending header bar or rail portion 16, and the rearward portion of the cowl 12 terminates in a transversely extending rail of a sectional configuration as shown at 17. The header bar 16, the lower rail configuration 17 on the cowl and a similarly formed configuration upon the pillar post portions 14 together form a windshield opening 18.

The present invention is primarily concerned with the method and means of mounting the glazing or transparent windshield panel 20 within the opening 18. As the configuration of the metal body construction bounding the opening 18 is substantially uniform throughout its contour, and as Figure 8 illustrates the cross sectional configuration of such contour, reference is particularly directed to this figure for illustration of the details of mounting the windshield in the top and bottom rails or headers 16 and 17 and in the side pillar portions 14. The metal contour bounding the opening 18 is of sheet metal formed with a rearwardly extending portion 23 which is formed with an inwardly extending bead or flange 24 continuing entirely around the opening. Secured to the flange portion 24 is a second sheet metal member 25 having a portion extending parallel with flange 24 and spot welded thereto. The member 25 extends rearwardly and is formed with a series of spaced raised bosses or ridges 26 and a further rearwardly extending portion 27, the latter terminating in an inwardly projecting flange 28. The portions of the sheet metal member 25 disposed alternately between pairs of raised bosses or ridges 26 are folded or bent rearwardly to a configuration to provide retaining clips or ears 30 which with portions 27 and 28 form a recess or channel adapted to receive a tacking strip 32 which may be fabricated of pressed or twisted paper or other fibrous material.

As particularly shown in Figure 3, a door construction 34 is supported upon the vehicle by hinge elements (not shown) to provide access to the interior of the vehicle body 10. The door construction comprises an outer metal panel 35, inner trim panel 36 and a transversely extending metal panel 37 connecting the inner and outer panels as illustrated. A weather seal construction 38 is arranged to surround the door opening for excluding cold air and drafts in the clearance space between the door and the pillar post construction. In the form illustrated the weather seal comprises a core of hollow flexible rubber tubing 40 or the like enclosed within a cloth sheath 41 the latter having a laterally extending portion 42 which is attached to the fibrous strip 32 by means of tacks 43 or other suitable securing means.

The pillar portion 14 is of hollow configuration and is closed to provide a tubular form by means of a sheet metal member 45 which overlaps with a flange portion 46 forming a part of the pillar construction, the overlapping portions being suitably welded or otherwise secured to provide a strong and rigid connection. The pillar post is provided with a drip molding 48 which is welded or otherwise secured to a flange portion 49 of the pillar post construction.

The invention embraces a novel method or process of setting or affixing the glazed panel 20 in position which operation may be accomplished from the exterior of the vehicle. Heretofore it has been inventional construction to insert the windshield from the interior of the vehicle. In accordance with the principles of the present invention there is provided a supporting channel or grommet 50 preferably formed of rubber or other resilient material which forms a retaining means for securing a glazed panel 20 in the opening 18. Figure 4 illustrates the cross sectional configuration of the channel or grommet as molded or preformed before it is assembled in position. The grommet or resilient support 50 is provided with projecting portions 52 and 53 which bound a recess 54 the projections 52 and 53 being arranged to be distorted to receive the glazing 20 in the recesses 54. The interior walls of the projections 52 and 53 bounding the recess 54 are provided with slightly raised projections or ridges 56 which are particularly provided for the purpose of closely engaging or gripping the glazed panel 20 to provide an effective seal between the panel and the grommet. The grommet is molded with a projection 58 forming a channel or recess 59 which is adapted to accommodate the formed metal flange portion 24 as shown in Figure 3, the flange portion 24 serving to rigidly position and secure the grommet in the windshield opening. The grommet is also formed with a forwardly extending hook-like lip 60 which, when the grommet is in assembled position as shown in Figure 3, snugly fits the forward curved contour 61 of the pillar, header and cowl construction bounding the windshield opening. If desirable, a suitable adhesive or cementitious material may be interposed between the curved portion 61 of the metal construction and the hook-like lip 60 to insure an effective closed or sealed joint between these elements. However, it has been found that the resiliency in the lip portion 60 by reason of its pre-molded configuration has sufficient inherent stress to tightly grip the metal as at 61 and form a seal without the use of cement or the like.

In the process of assembling the grommet 50 and glazing panel 20 in the windshield opening 18, the windshield panel or glazing 20 is first fitted into the recess 54 formed in the grommet or resilient support 50. The pre-assembled panel 20 and the grommet 50 are then inserted from the front of the opening 18 exteriorly of the vehicle body and the projection 58 hooked over or distorted to fit over the inwardly extending metal flange 24. This is accomplished very rapidly through the use of a string or cord 70 lying in the recess 59. The grommet 50 and panel 20 are first disposed with the exterior surface of the hook-like portion 58 in contact with the flange 24. A workman on the interior of the vehicle grasps an end of the cord 70, which is permitted to project from the recess 59, and as the cord is progressively withdrawn or extracted from the recess, it progressively moves the hook-like portion 58 over the metal flange 24, thus permanently affixing the grommet and windshield panel in place.

A retaining bar or escutcheon 65 is applied in the position shown in Figure 3, the latter being held in place by means of metal screws 66 which pass through openings in the raised bosses or ridges 26. The escutcheon 65 serves to fixedly secure the projection 58 in its proper position as indicated in Figure 3, and also provides a molding or finishing strip of pleasing appearance.

In the present invention the glazing 20 will be resiliently held in position by the grommet 50 and the entire assembly made exteriorly of the vehicle. This not only simplifies the assembly but minimizes the amount of labor required in the operation.

It is apparent that, within the scope of the invention, modifications and different arrangements may be made other than is herein disclosed, and the present disclosure is illustrative merely, the invention comprehending all variations thereof.

What I claim is:

1. In combination, a vehicle body having an opening, said opening being bounded by an inwardly extending flange formed on the body, a windshield panel, a flexible element having a channel for receiving the marginal edge of said panel, the forward wall of said channel being provided by a yieldable lip which overlies the marginal edge of the outer face of the windshield panel, said flexible element being formed with a second channel in which said flange is accommodated, said windshield panel being located in front of said inwardly extending flange, and means at the rear of said windshield panel for holding said flexible element on said flange, said flange and means providing the sole means for restraining fore and aft movement of said flexible element and said lip providing the sole means for holding said panel in said first mentioned channel against forward movement.

2. In combination, a vehicle body having an opening, said opening being bounded by an inwardly extending flange formed on the body, a windshield panel, a flexible element having a channel for receiving the marginal edge of said panel, the forward wall of said channel being provieded by a yieldable lip which overlies the marginal edge of the outer face of the windshield panel, said flexible element being formed with a second channel in which said flange is accommodated, said windshield panel being located in front of said inwardly extending flange, and an escutcheon strip at the rear of said windshield panel for holding said flexible element on said flange, said flange and escutcheon strip providing the sole means for restraining fore and aft movement of said flexible element and said lip providing the sole means for holding said panel in said first mentioned channel against forward movement.

NORMAN A. SCHASSBERGER.

REFERENCES CITED

The following references are of record in the file of this patent:

UNITED STATES PATENTS

| Number | Name | Date |
| --- | --- | --- |
| 2,061,760 | Fisher | Nov. 24, 1936 |
| 2,093,614 | Lynch | Sept. 21, 1937 |
| 2,261,038 | Sherts | Oct. 28, 1941 |

FOREIGN PATENTS

| Number | Country | Date |
| --- | --- | --- |
| 702,060 | Germany | Jan. 29, 1941 |